United States Patent
Johansson et al.

(10) Patent No.: US 10,560,184 B2
(45) Date of Patent: Feb. 11, 2020

(54) OPTICAL SWITCHING SYSTEM FOR OPTICAL LINE PROTECTION IN SINGLE FIBER TRANSMISSION

(71) Applicant: Infinera Corporation, Annapolis Junction, MD (US)

(72) Inventors: Bengt Johansson, Hägersten (CH); Ola Wikström, Stockholm (CH)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 16/041,113

(22) Filed: Jul. 20, 2018

(65) Prior Publication Data

US 2019/0215059 A1    Jul. 11, 2019

Related U.S. Application Data

(60) Provisional application No. 62/615,891, filed on Jan. 10, 2018.

(51) Int. Cl.
*H04B 10/00* (2013.01)
*H04B 10/032* (2013.01)
(Continued)

(52) U.S. Cl.
CPC .......... *H04B 10/032* (2013.01); *H04B 10/25* (2013.01); *H04J 14/029* (2013.01);
(Continued)

(58) Field of Classification Search
CPC .... H04B 10/032; H04B 10/03; H04B 10/038; H04B 10/2503; H04B 10/25;
(Continued)

(56) References Cited

U.S. PATENT DOCUMENTS 6,351,476 B2 *  2/2002  Kner .................. H01S 5/06804
                                                     372/20
6,941,079 B1    9/2005  Barozzi et al.
(Continued)

OTHER PUBLICATIONS

Ghuman, Harj; "DWDM Access for Remote PHY Networks Integrated Optical Communications Module (OCML)"; SCTE/ISBE 2017 Fall Technical Forum; Oct. 2017.

*Primary Examiner* — Hibret A Woldekidan
(74) *Attorney, Agent, or Firm* — David L. Soltz

(57) ABSTRACT

Systems and methods are disclosed, including an optical switching system comprising an upstream optical signal detector between a first node and a second node configured to detect optical signals from the second node and to switch data traffic from a working path to a protecting path when optical signals from the second node are indicative of a failure in the working path; wherein the first node is configured to transmit data traffic in first optical signals with wavelengths in channels in a first band and receive the data traffic in second optical signals with wavelengths in channels in a second band from the second node; and one or more optical filter, between the second node and the upstream optical signal detector, configured to block signals with wavelengths in the first band that are reflected because of a break in the path between the optical filter and the second node.

18 Claims, 5 Drawing Sheets

(51) Int. Cl.
*H04Q 11/00* (2006.01)
*H04B 10/25* (2013.01)
*H04J 14/02* (2006.01)

(52) U.S. Cl.
CPC . *H04Q 11/0062* (2013.01); *H04Q 2011/0016* (2013.01); *H04Q 2011/0081* (2013.01)

(58) Field of Classification Search
CPC .............. H04B 10/07955; H04B 10/07; H04B 10/0795; H04Q 11/0062; H04Q 2011/0016; H04Q 2011/0081; H04Q 2011/0083; H04Q 11/0005; H04Q 2011/0009; H04J 14/0293; H04J 14/02; H04J 14/0287; H04J 14/0212; H04J 2203/006; H04L 45/28

USPC ..... 398/1, 2, 5, 7, 10, 12, 17, 19, 20, 21, 58
See application file for complete search history.

(56) References Cited

U.S. PATENT DOCUMENTS

| | | | |
|---|---|---|---|
| 7,197,241 B2* | 3/2007 | Weston-Dawkes | H04J 14/0284 398/12 |
| 7,231,146 B2* | 6/2007 | Arecco | H04J 14/0291 398/30 |
| 7,343,093 B2 | 3/2008 | Oberg et al. | |
| 7,486,629 B2* | 2/2009 | Klaghofer | H04M 3/567 370/261 |
| 7,764,881 B2* | 7/2010 | Aoki | H04Q 11/0005 398/19 |
| 7,805,073 B2* | 9/2010 | Sabat, Jr. | H04B 10/25752 398/5 |
| 7,970,278 B2* | 6/2011 | Kinoshita | H04J 14/0204 398/1 |
| 8,135,273 B2* | 3/2012 | Sabat, Jr. | H04B 10/25752 398/5 |
| 8,805,182 B2* | 8/2014 | Sabat, Jr. | H04B 10/25752 398/5 |
| 9,723,385 B2* | 8/2017 | Hu | H04Q 11/0005 |
| 10,205,553 B2* | 2/2019 | Magri | H04B 10/071 |
| 2005/0180316 A1* | 8/2005 | Chan | H04J 14/0291 370/216 |
| 2019/0215091 A1* | 7/2019 | Johansson | H04B 10/07955 |

* cited by examiner

OPTICAL SWITCHING SYSTEM FOR OPTICAL LINE PROTECTION IN SINGLE FIBER TRANSMISSION

INCORPORATION BY REFERENCE

The entirety of the following patents and patent applications are hereby expressly incorporated herein by reference: provisional patent application Ser. No. 62/615,891, filed Jan. 10, 2018, entitled "Solution for optical line protection on single fiber transmission."

FIELD OF THE DISCLOSURE

The disclosure generally relates to methods and apparatuses used for optical fiber protection in optical transmission systems. Optical fiber protection systems use an optical detect function in order to select which fiber path that could be used for optical data transmission. If the working fiber path loses optical power, for example in a cut fiber scenario, a photo detector detects loss of light and a switch function performs an automatic switch to the protecting fiber path. More particularly the disclosure relates to optical line protection in optical single fiber transmission. The inventions disclosed work with any protocol, including, but not limited to, OTN, SDH, Ethernet, CPRI, eCPRI, and Fibre channel.

BACKGROUND

Wave-division multiplexing (WDM) is a type of multiplexing in which two or more optical carrier signals are multiplexed onto a single optical fiber by using different wavelengths (that is, colors) of laser light.

Bandwidth is the data transfer capacity of a link or connection (also referred to as a "path"), which may be expressed in optical data units, bits per second, number of time slots, or expressed by other methods.

In many optical transmission systems, such as p2p networks, there are (1) working connections within the network having multiple nodes and communication links for transmitting data between a headend node and a tailend node; and (2) protecting connections specifying a different communication links for transmitting data between the headend node to the tailend node in the event that one or more of the working connections fail. Working connections may also be referred to as working paths. Protecting connections may also be referred to as recovery paths and/or protecting paths and/or protection paths. A first node of a path may be referred to as a headend node or a source node. A last node of a path may be referred to as a tailend node or end node or destination node. Typically, the headend node (the active node) initially selects to receive data over the working connection and then, when a working connection fails, the headend node selects a protecting connection for passing data within the network. The set up and activation of the protecting connections may be referred to as protection. Protection mechanisms, where network resources act as backup for working connections, have been in use for some time.

However, in single fiber transmission, bidirectional or counter-propagating receiver (Rx) and (transmitter) Tx wavelengths travel on the same fiber. If a reflection coming from an end of a cut or disconnected fiber is mistaken as a valid signal at the optical detector, no protection switch may be performed.

SUMMARY

Systems and methods are disclosed addressing the problem of optical signal reflections from a cut fiber being mistaken as a valid signal and preventing switching to protecting paths in systems using optical single fiber transmission, through filtering of the signals in the wavelength band transmitted by a headend node (that is, an upstream node). A system consistent with the present disclosure provides an optical line protection function for single fiber operation, even in the event of a strong reflection from a cut or disconnected portion of a fiber in a path of an optical transmission system.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
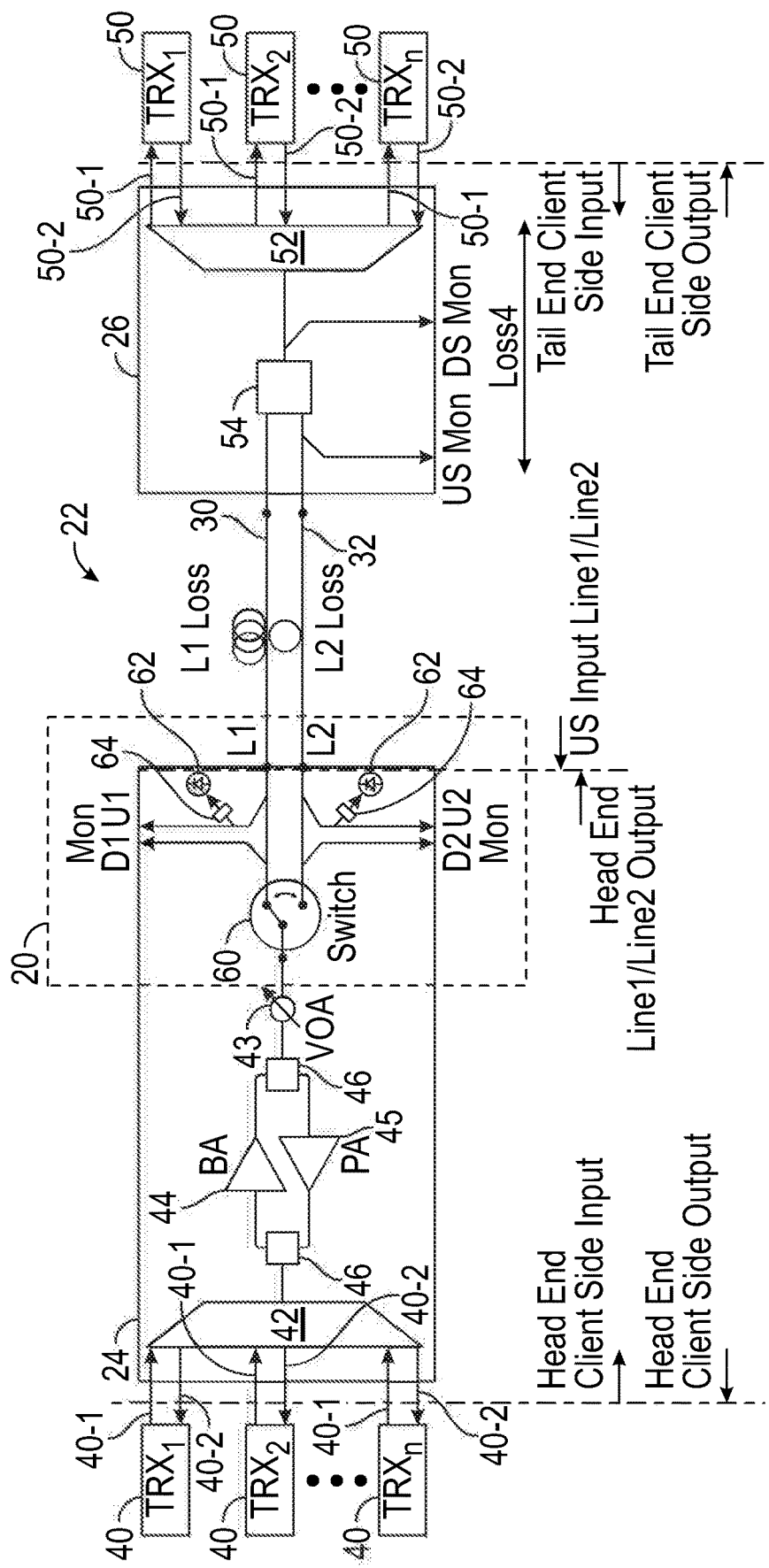
FIG. 1 is a schematic of an exemplary single-fiber optical transmission system in accordance with the inventive concepts of the present disclosure.

The following detailed description refers to the accompanying drawings. The same reference numbers in different drawings may identify the same or similar elements.

The mechanisms proposed in this disclosure circumvent the problems described above. The present disclosure describes systems and methods in optical single fiber transmission for providing filtering of optical signals in the wavelength band transmitted by an upstream node and switching data traffic from a working path to a protection path in the event of a failure of the working path. Though exemplary failure types are described, it will be understood that the system applies to any path failure that results in reflected optical signals.

In one exemplary embodiment, an optical switching system, comprises one or more upstream optical signal detector between a first node and a second node configured to detect optical signals from the second node and to activate the switching of data traffic from a working path, that carries bidirectional data traffic between the first node and the second node in an optical transmission system when there is no failure in the working path, to a protecting path that carries the bidirectional data traffic between the first node and the second node when there is a failure in the working path, when optical signals from the second node are indicative of a failure in the working path by being one or more of (1) below a predetermined level of power and (2) not detected; wherein the first node is configured to transmit data traffic in first optical signals with wavelengths in channels in a first band and receive the data traffic in second optical signals with wavelengths in channels in a second band, and the second node is designed to transmit the data traffic in the second optical signals with wavelengths in channels in the second band and receive the data traffic in the first optical signals with wavelengths in channels in the first band; and one or more optical filter between the second node and the upstream optical signal detector, the optical filter configured to block signals with wavelengths in channels in the first band that are reflected because of a break in the working path between the optical filter and the second node.

In one exemplary embodiment, the optical switching system may further comprise a switch positioned between a transceiver of the first node and the second node, the switch configured to switch the data traffic from a working path to the protecting path when activated by the upstream optical signal detector.

In one exemplary embodiment, a method is disclosed comprising: monitoring, with one or more upstream optical signal detector positioned between a first node and a second node in an optical transmission system, optical signals from the second node on a working path in the optical transmission system, wherein the working path carries data traffic between the first node and the second node in the optical transmission system when there is no failure in the working path, wherein the first node is configured to transmit the data traffic in first optical signals with wavelengths in channels in a first band and receive the data traffic in second optical signals with wavelengths in channels in a second band, and the second node is designed to transmit the data traffic in the second optical signals with wavelengths in channels in the second band and receive the data traffic in the first optical signals with wavelengths in channels in the first band; filtering, with one or more optical filter positioned between the upstream optical signal detector and the second node, signals with wavelengths in channels in the first band from the first node that are reflected from a break in the working path between the optical filter and the second node such that the optical signals with wavelengths in channels in the first band from the first node reflected from the break are blocked from reaching the upstream optical signal detector; and detecting, with the upstream optical signal detector, optical signals between the first node and the second node.

In one exemplary embodiment, a system, comprises: a working path in an optical transmission system, wherein the working path carries bidirectional data traffic in the optical transmission system when there is no failure in the working path; a protecting path in the optical transmission system, wherein the protecting path carries the data traffic in the optical transmission system when there is a failure in the working path; a tailend node in the optical transmission system designed to receive data traffic in first optical signals with wavelengths in channels in a first band and transmit data traffic in second optical signals with wavelengths in channels in a second band; and a headend node in the optical transmission system configured to transmit data traffic in the first optical signals with wavelengths in channels in the first band and receive the data traffic in the second optical signals with wavelengths in channels in the second band, the headend node comprising: an upstream optical signal detector positioned between the headend node and the tailend node and configured to detect optical signals from the tailend node and to implement a switch of data traffic from the working path to the protecting path if signals from the tailend node are indicative of a failure in the working path by being one or more of (1) below a predetermined level of power and (1) not detected, and one or more optical filter between the upstream optical signal detector and the tailend node, the optical filter blocking signals with wavelengths in channels in the first band from the headend node that are reflected from a break in the working path between the optical filter and the tailend node.

Definitions

If used throughout the description and the drawings, the following short terms have the following meanings unless otherwise stated:

dB stands for decibel.

dBm stands for decibel milliWatt, which is a unit of measurement of signal strength or power level. Zero dBm is defined as one mW (milliWatt) of power into a terminating load such as an antenna or power meter. Small signals are negative numbers (e.g. −83 dBm).

The term "filtering" as used herein refers to blocking at least a portion of, or all of, optical signals in one or more particular wavelengths.

Rx stands for Receiver, which typically refers to optical channel receivers, but can also refer to circuit receivers.

TRX stands for Transceiver, which can transmit and receive signals. The Transceiver may be referred to as having both transmission (or transmitter) and receiving (or receiver) functions.

Tx stands for Transmitter, which typically refers to optical channel transmitters, but can also refer to circuit transmitters.

The term "upstream" as used herein may refer to the active side and/or a headend node of an optical transmission system. The term "downstream" as used herein may refer to the passive side and/or a tailend node within the optical transmission system.

WDM stands for wave-division multiplexing, also known as wavelength-division multiplexing. DWDM stands for dense wave-division multiplexing Description As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Further, the phrase "based on" is intended to mean "based, at least in part, on" unless explicitly stated otherwise.

Also, certain portions of the implementations have been described as "components" or "circuitry" that perform one or more functions. The term "component" or "circuitry" may include hardware, such as a processor, an application specific integrated circuit (ASIC), or a field programmable gate array (FPGA), or a combination of hardware and software. Software includes one or more computer executable instructions that when executed by one or more component cause the component or circuitry to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As discussed above, optical signal reflections from cut or disconnected portions of optical fibers in single-fiber transmission paths of optical transmission systems may prevent the switching of data traffic from a failed working path to a protecting path, as the reflections may be misinterpreted as actual return signals from a downstream node. The present disclosure addresses these deficiencies with systems and methodologies for filtering optical signals with wavelengths in channels in the one or more bands from the upstream node that are reflected because of a failure in the working path, such that the reflected signals are blocked and are not considered in switching decisions.

Figure 2:
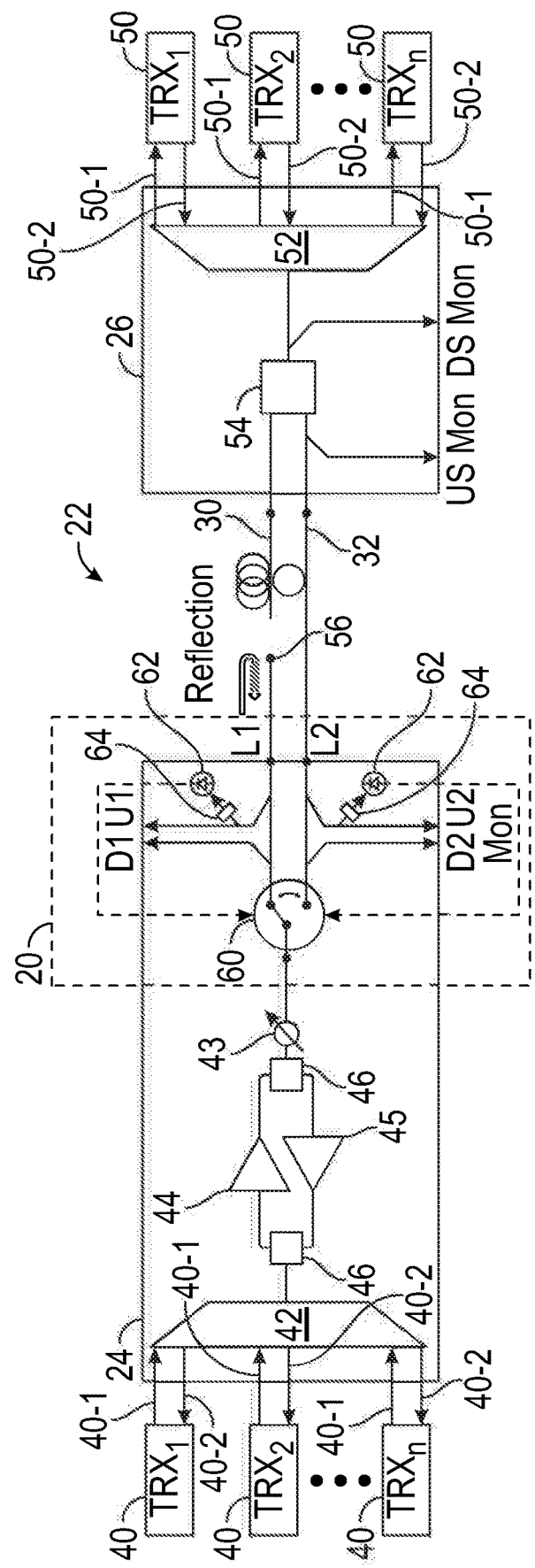
FIG. 2 is a schematic of the exemplary single-fiber optical transmission system of FIG. 1, in which there is a failure in the working path.

Referring now to the drawings, FIGS. 1 and 2 illustrate an exemplary optical switching system 20 for an optical transmission system 22 utilizing bi-directional single-fiber type transmission. The optical transmission system 22 comprises a first node and a second node. For exemplary purposes, the first node may be referred to as a headend node 24 and the second node may be referred to as a tailend node 26. The first node may be an active headend node 24 and the second node may be a passive tailend node 26. For explanatory purposes, the active side and/or the headend node 24 may be referred to as "upstream" within the optical transmission system 22, while the passive side and/or tailend node 26 may be referred to as "downstream" within the optical transmission system 22. However, it will be understood that either or both of the headend node 24 and the tailend node 26 may be active or passive.

The optical transmission system 22 further comprises one or more bi-directional optical fibers such as a working path 30 that carries data traffic back and forth between the headend node 24 and the tailend node 26 in the optical transmission system 22 when there is no failure in the working path 30. The optical transmission system 22 further comprises a protecting path 32 that carries data traffic back and forth between the headend node 24 and the tailend node 26 in the optical transmission system 22 when there is a failure in the working path 30.

The headend node 24 may comprise one or more transceivers 40. The headend node 24 and/or the one or more transceivers 40 may be configured to transmit output 40-1 data traffic in first optical signals with wavelengths in channels in one or more first wavelength band through the working path 30 or the protecting path 32. The headend node 24 and or the one or more transceivers 40 may be further configured to receive input 40-2 data traffic in second optical signals 40-2 with wavelengths in channels in one or more second wavelength band. The one or more transceivers 40 may be CWDM, DWDM, or tunable DWDM transceivers, for example.

The headend node 24 may further comprise one or more filter 42 configured to demultiplex/multiplex the optical signals to/from the one or more transceivers 40. In one embodiment the filter 42 may be one or more array waveguide (AWG) filter. In one embodiment, the filter 42 may be a red/blue filter. The headend node 24 may further comprise one or more of the following components: a variable optical attenuator (VOA) 43, a booster amplifier 44, a preamplifier 45, and a coupler 46. In one embodiment, the one or more coupler 46 may be a thin-film filter. In one embodiment, the headend node 24 may have two VOAs 43, a first VOA 43 in the working path 30, and a second VOA 43 in the protecting path 32.

In one embodiment, the preamplifier 45 may be a variable gain amplifier, which maintains its characteristics (mainly flat gain) for different gain settings. In one embodiment the booster amplifier 44 may be a fixed gain amplifier that may be used in conjunction with another VOA (not shown), in which the VOA may then be used to obtain different gain (where the VOA 43 is included in the gain). Changing the gain setting of the preamplifier 45 and/or the booster amplifier 44 may compensate for different fiber losses to achieve a desired output power from the client side and from the line side of the optical transmission system 22.

The tailend node 26 may comprise one or more transceiver 50. The tailend node 26 and/or the one or more transceiver 50 may be designed to receive input 50-1 data traffic in the first optical signals with wavelengths in channels in the one or more first wavelength band through the working path 30 or the protecting path 32 from the headend node 24. The tailend node 26 and/or the one or more transceiver 50 may further be designed to transmit output 50-2 data traffic in the second optical signals with wavelengths in channels in the one or more second wavelength band. The one or more transceivers 50 may be CWDM, DWDM, or tunable DWDM transceivers, for example.

The tailend node 26 may further comprise one or more filter 52 designed to demultiplex/multiplex the optical signals to/from the one or more transceivers 50. In one embodiment the filter 52 may be one or more thin-film filter. In one embodiment, the filter 52 may be one or more array waveguide (AWG) filter. In one embodiment, the filter 52 may be a red/blue filter. The tailend node 26 may further comprise one or more coupler 54.

The optical transmission system 22 uses bidirectional single-fiber transmission in that the headend node 24 transmits data traffic in wavelengths in channels "downstream" to the tailend node 26 in the first wavelength band, and the tailend node 26 transmits data traffic in wavelengths in channels "upstream" to the headend node 24 in the second wavelength band on the same optical fiber, such as the working path 30. For example, the headend node 24 may transmit twenty channels downstream to the tailend node 26, and the tailend node 26 may transmit twenty channels upstream to the headend node 24 on the working path 30 and the same twenty channels on the protecting path 32.

In one embodiment, the first optical signals have wavelengths in a plurality of first pre-designated wavelength bands for transmission on the working path 30 or the protecting path 32. In one embodiment, the second optical signals have wavelengths in a plurality of second pre-designated wavelength bands, different from the plurality of the first pre-designated wavelength bands, for transmission on the working path 30 and the protecting path 32.

While an exemplary optical transmission system 22 having a band of DWDM optical signals propagating toward the tailend node 26 and a band of optical signals propagating toward the headend node 24 is described herein, in one embodiment the WDM optical signals may be interleaved and an interleave filter (not shown) may be used to separate/combine the WDM optical signals. In such a scenario, the first wavelength band may comprise a first plurality of predetermined bands and the second wavelength band may comprise a second plurality of predetermined bands. In one non-exclusive example, the first and second wavelength bands may be interleaved, such as alternating channels being in the first band then the second band.

Figure 3:
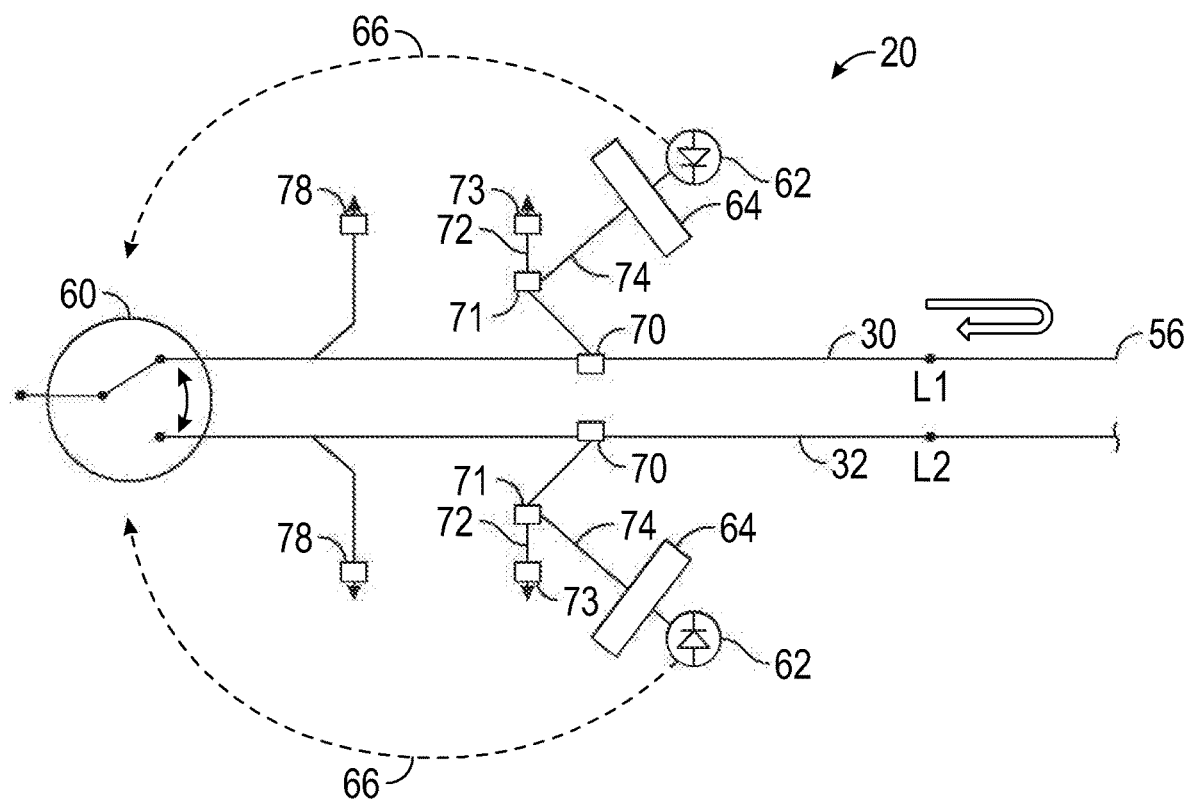
FIG. 3 is a schematic of an exemplary single-fiber optical switching system in accordance with the inventive concepts of the present disclosure.

As further shown in FIG. 3, the optical switching system 20 of the optical transmission system 22 may comprise one or more upstream optical signal detector 62 and one or more optical filter 64. In one embodiment, the optical switching system 20 may further comprise a switch 60.

In one embodiment, the optical switching system 20 may be part of, or positioned at least partially in, the headend node 24. In one embodiment, one or more of components of the optical switching system 20 may be part of, or positioned at least partially in, the headend node 24. In one embodiment, one or more of the switch 60, the one or more upstream optical signal detector 62, and the one or more optical filter 64 of the optical switching system 20 may be part of, or positioned at least partially in, the headend node 24.

In one embodiment, the switch 60 may be an optical switch that is a physical component of the optical switching system 20. In one embodiment, the switch 60 may be embodied by and/or implemented by electrically switching data traffic from one path to another path using other sets of receiver-transmitter (RxTx) pairs. For example, if the optical transmission system 22 is a bidirectional system without optical layer zero (L0) protection, when the upstream optical signal detector 62 detects LOS (loss of signal), the optical switching system 20 may electrically switch over to another path, such as from the working path 30 to the protecting path 32, using dedicated sets of Receiver-Transmitter (RxTx) pairs (not shown). In one embodiment, the headend node 24 may comprise receiver-transmitter (RxTx) pairs dedicated by optical line. For example, the headend node 24 may comprise a first dedicated receiver-transmitter pair for the working path 30 and a second dedicated receiver-transmitter pair for the protecting path 32) (not shown). In such a system, the data traffic may be electrically switched from the first dedicated receiver-transmitter pair to the second dedicated receiver-transmitter pair if there is a failure in the working path 30.

Returning to FIGS. 1 and 2, in one embodiment, the switch 60 may be positioned between the transceiver 40 of the headend node 24 and the tailend node 26. The switch 60 may be configured to switch data traffic between the working path 30 and the protecting path 32, such as when there is a failure in the working path 30 and/or when the failure in the working path 30 is fixed and the data traffic is switched back from the protecting path 32 to the working path 30, which may be referred to as revertive switching. In one embodiment, the system or user may check the original working path 30 for power (transmission of optical signals) for a predetermined settable time, and if the original working path 30 maintains power for that predetermined settable time, then the system or user may switch the data traffic back to the original working path 30 from the protecting path 32. Of course, it will be understood that the primary fiber to be used as the working path 30 may be settable, and another fiber may be designated as the working path 30.

The one or more upstream optical signal detector 62 may be positioned logically between the switch 60 and the tailend node 26. The upstream optical signal detector 62 may be configured to detect optical signals from the tailend node 26. The upstream optical signal detector 62 may be configured to activate the switch 60 to switch data traffic from the working path 30 to the protecting path 32, if signals from the tailend node 26 are indicative of a failure in the working path 30. Loss of optical signals from the tailend node 26 may be indicative of a failure in the working path 30 when the optical signals are one or more of (1) below a predetermined level of power, and (2) not detected. The predetermined level of power may be referred to as a Loss of Signal threshold.

In one embodiment, the upstream optical signal detector 62 may send one or more activation signal 66 to the switch 60 to activate the switch 60 to switch data traffic from the working path 30 to the protecting path 32. In one embodiment, data traffic is switched after verifying that the protecting path 32 is in working condition, that is, has a valid input power level without a loss of signal that causes the optical signals to be below a predetermined level of power.

In one embodiment, the upstream optical signal detector 62 may send one or more activation signal 66 to electrically switch data traffic between the working path 30 and the protecting path 32 using dedicated sets of receiver-transmitter (RxTx) pairs (not shown).

In one embodiment, one or more of the one or more upstream optical signal detector 62 may be one or more PIN photodiodes. A PIN photodiode is a diode with a wide, undoped intrinsic semiconductor region between a p-type semiconductor and an n-type semiconductor region.

The one or more optical filter 64 may be positioned between the tailend node 26 and the upstream optical signal detector 62. The optical filter 64 may be configured to block signals with wavelengths in channels in the first wavelength band originally from the headend node 24 that are reflected because of a failure in the working path 30, such as a failure between the optical filter 64 and the tailend node 26. More particularly, the one or more optical filter 64 is configured to block possible reflected optical signals from reaching the upstream optical signal detector 62, thus avoiding false signals and enabling the upstream optical signal detector 62 to activate the switch 60 to switch the data traffic, or electrically switch the data traffic, to the protecting path 32 when there is a failure in the working path 30.

In one embodiment, the optical filter 64 suppresses all optical signals having wavelengths in channels in wavelength bands other than the optical signals in the channels in the second wavelength band coming from the tailend node 26. In one embodiment, the one or more optical filter 64 may be one or more thin-film filter.

Figure 4:
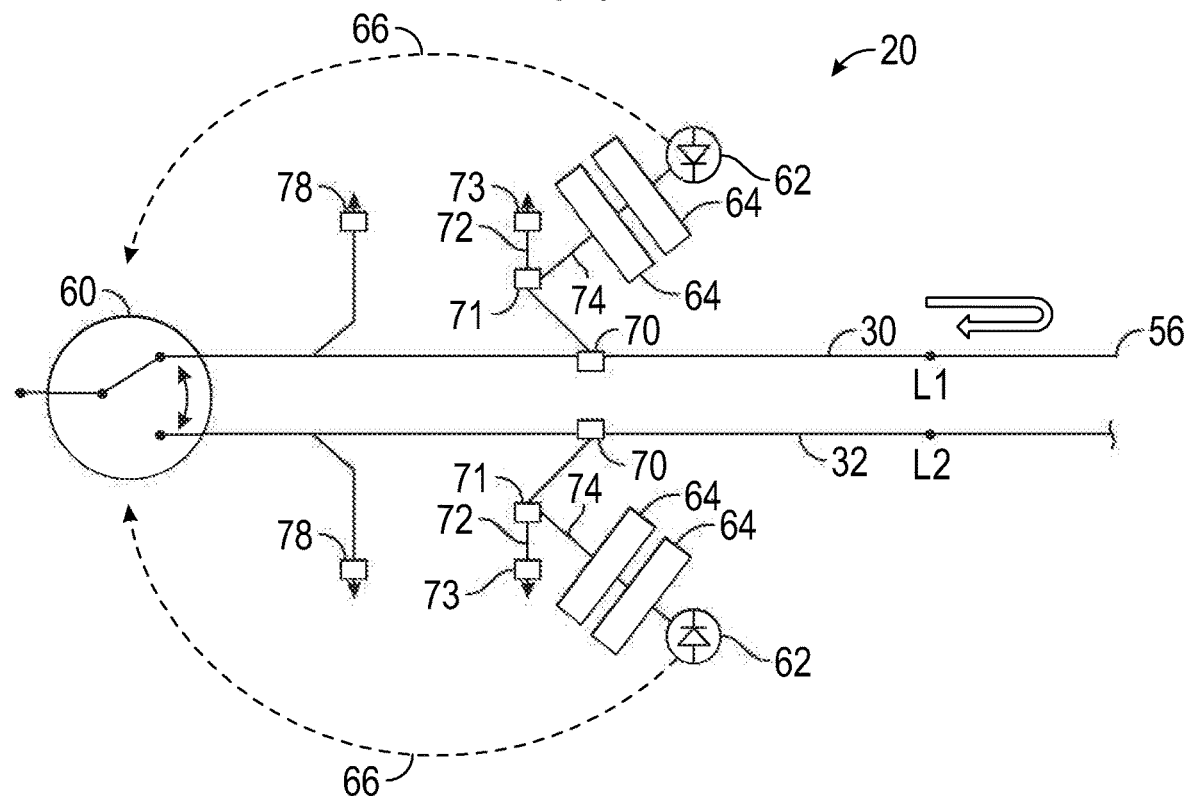
FIG. 4 is a schematic of another exemplary single-fiber optical switching system in accordance with the inventive concepts of the present disclosure.

In one embodiment, the one or more optical filter 64 may be two or more optical filters 64, as shown in FIG. 4. In one embodiment, the two or more optical filters 64 may be two or more thin-film filters. In one embodiment, the number and/or type of optical filters 64 is dependent at least in part on booster power and expected channel power coming in to the working path 30 and/or the protecting path 32. Multiple optical filters 64 may be used to suppress the reflected optical signals power. It will be understood that multiple optical filters 64 may be contained within a single component and/or single housing.

As one non-exclusive example, two optical filters 64 together in sequence ("daisy-chained") may reach approximately 40 dB isolation, which may be needed in some cases to block the optical signals reflected because of the cut portion 56 of the working path 30 or the protecting path 32.

Figure 5:
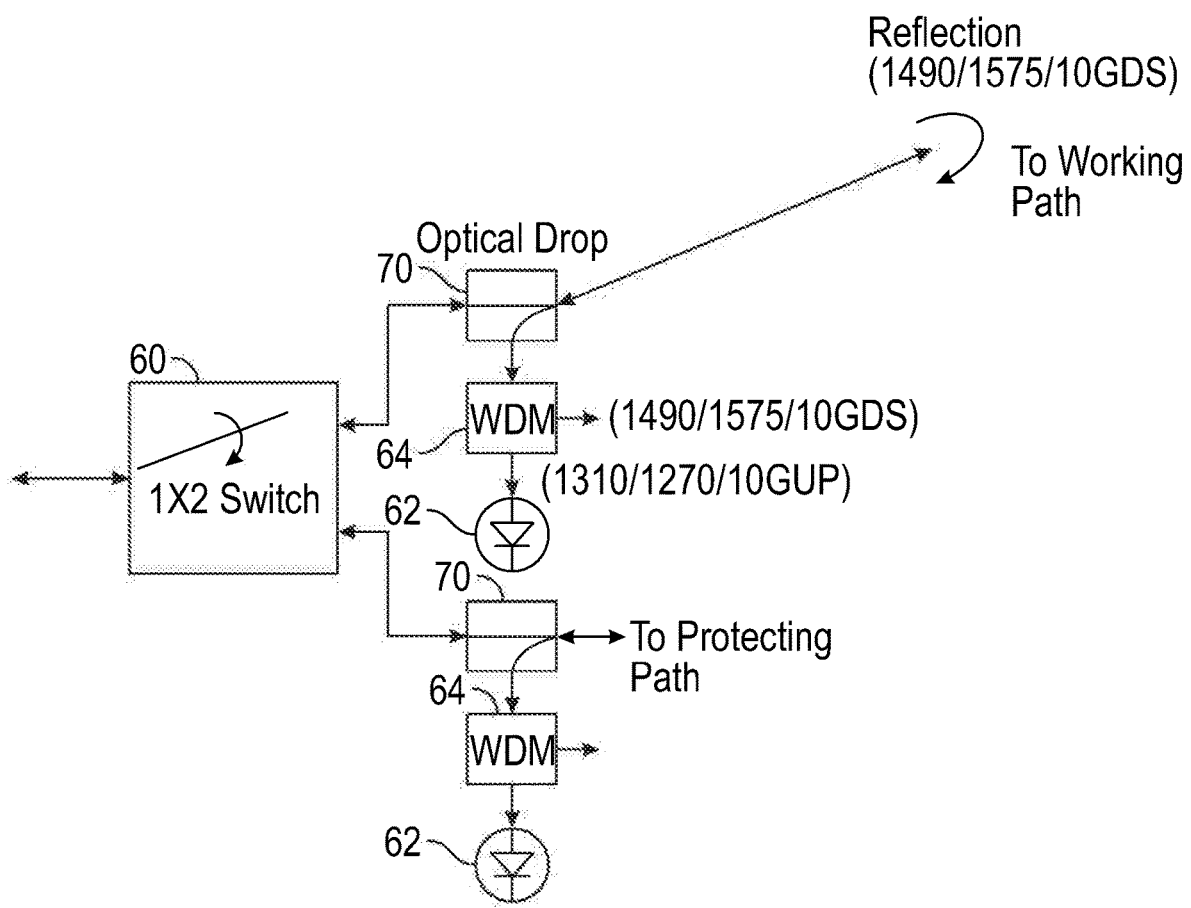
FIG. 5 is a schematic of another exemplary single-fiber optical switching system in accordance with the inventive concepts of the present disclosure.

In one embodiment, as shown in FIG. 5, the one or more optical filter 64 may filter the optical signals in the channels from the headend node 24 that are reflected because of a break in the working path 30.

In one embodiment, both the working path 30 and the protecting path 32 may be monitored with optical signal detectors 62 equipped with one or more optical filters 64. In one embodiment, the one or more upstream optical signal detector 62 includes two or more upstream optical signal detectors 62, one of which is positioned to monitor optical signals from the tailend node 26 on the working path 30 in the optical transmission system 22 and one of which is positioned to monitor optical signals from the tailend node 26 on the protecting path 32 in the optical transmission system 22. Likewise, in one embodiment, the one or more optical filter 64 may include two or more optical filters 64, one of which is positioned to filter the optical signals with wavelengths in channels in the first wavelength band from the headend node 24, such as those that may be reflected from a failure in the working path 30 are blocked from reaching the upstream optical signal detector 62 for the working path 30, and one of which is positioned to filter the optical signals with wavelengths in channels in the first wavelength band from the headend node 24, such as those that may be reflected from a failure in the protecting path 32 are blocked from reaching the upstream optical signal detector 62 for the protecting path 32.

In one embodiment, the one or more optical filter 64 may include two or more optical filters 64, including two optical filters 64 both positioned to filter the optical signals with wavelengths in channels in the first wavelength band from the headend node 24 such that they do not reach the same upstream optical signal detector 62. For example, when booster power and/or expected channel power are high, two or more optical filters 64 may be used between the upstream optical signal detector 62 and the tailend node 26 and may provide additional isolation capability for the same upstream optical signal detector 62. In one embodiment, the two optical filters 64 may be positioned in sequence (also known as "daisy chained") to increase the suppression of the optical signals with wavelengths in channels in the first band from the headend node 24. In one example, two optical filters 64 may be used in sequence between the upstream optical signal detector 62 and the tailend node 26 to reach approximately 40 dB isolation. In one embodiment, the system may have multiple sequences of daisy-chained filters to suppress different wavelengths in each daisy-chain. In one embodiment, different ones of the two or more optical filters 64 may filter different bands of optical signals.

In one embodiment, as shown in FIGS. 3 and 4, the optical switching system 20 may further comprise one or more optical coupler 70. The optical coupler 70 may drop a portion of the light from the optical signals moving from the tailend node 26 on the working path 30 and/or the protecting path 32. The optical coupler 70 may drop a portion of the light from the optical signals moving toward the headend node 24 from the direction of the tailend node 26 on the working path 30 and/or the protecting path 32 through the one or more optical filter 64. One non-exclusive example of the optical coupler 70 is a coupler configured for 17 dB/2%. The optical coupler 70 may be positioned between the headend node 24 and the tailend node 26. In one embodiment, the optical coupler 70 may be positioned between the one or more optical filter 64 and the tailend node 26. In one embodiment, the optical coupler 70 may be positioned between the switch 60 and the tailend node 26. In one embodiment, the optical coupler 70 may be positioned between the switch 60 and the one or more optical filter 64.

In one embodiment, optical coupler 70 is a first optical coupler 70, and the optical switching system 20 may further comprise one or more second optical coupler 71. The second optical coupler 71 may be positioned between the first optical coupler 70 and the optical filter 64. One non-exclusive example of the optical coupler 70 is a coupler configured for 3 dB, which may split 50% of the optical power to the filter and allow 50% of the optical power to continue to a monitoring port 73. It will be understood that there may be other couplers in the optical transmission system 22.

In one embodiment, the light dropped by the optical coupler 70 may be split into two or more paths. In one embodiment, the light dropped by the optical coupler 70 may be split into a monitor path 72 and a detector path 74. The monitor path 72 may continue to the monitor port 73, for example, where a user may attach an optical spectrum analyzer or a similar device. The detector path 74 may drop a portion of the incoming light off to the one or more optical filter 64.

In one embodiment, the optical transmission system 22 further comprises one or more additional upstream monitor ports 76 and/or one or more downstream monitor ports 78.

As illustrated in FIG. 2, as previously discussed, when a failure in the working path 30 or the protecting path 32 occurs, such as, for example, from a break, cut, or disconnect, the first optical signals with wavelengths in channels in the first wavelength band may be reflected because of the cut portion 56 of the working path 30 or the protecting path 32. The strength of the power of the reflected optical signals may be dependent on, and/or related to, the angle of the cut portion 56 in the working path 30 or the protecting path 32.

For example, a clean ninety-degree fiber cut in the working path 30 or the protecting path 32 typically has −14 dB optical return loss (ORL), which originates from the difference between the refractive index of the fiber (approximately 1.5) and air. This is typically the maximum optical return loss. This strong optical return loss may not occur in a typical fiber cut, which is usually not ninety degrees. However, the strong optical return loss is more likely to occur if a connector in a fiber distribution panel is accidently disconnected. Cuts that result in oblique angles of the cut portion 56 in the working path 30 or the protecting path 32 may result in less reflection of the optical signal and therefore optical return losses of lesser strength.

Figure 6:
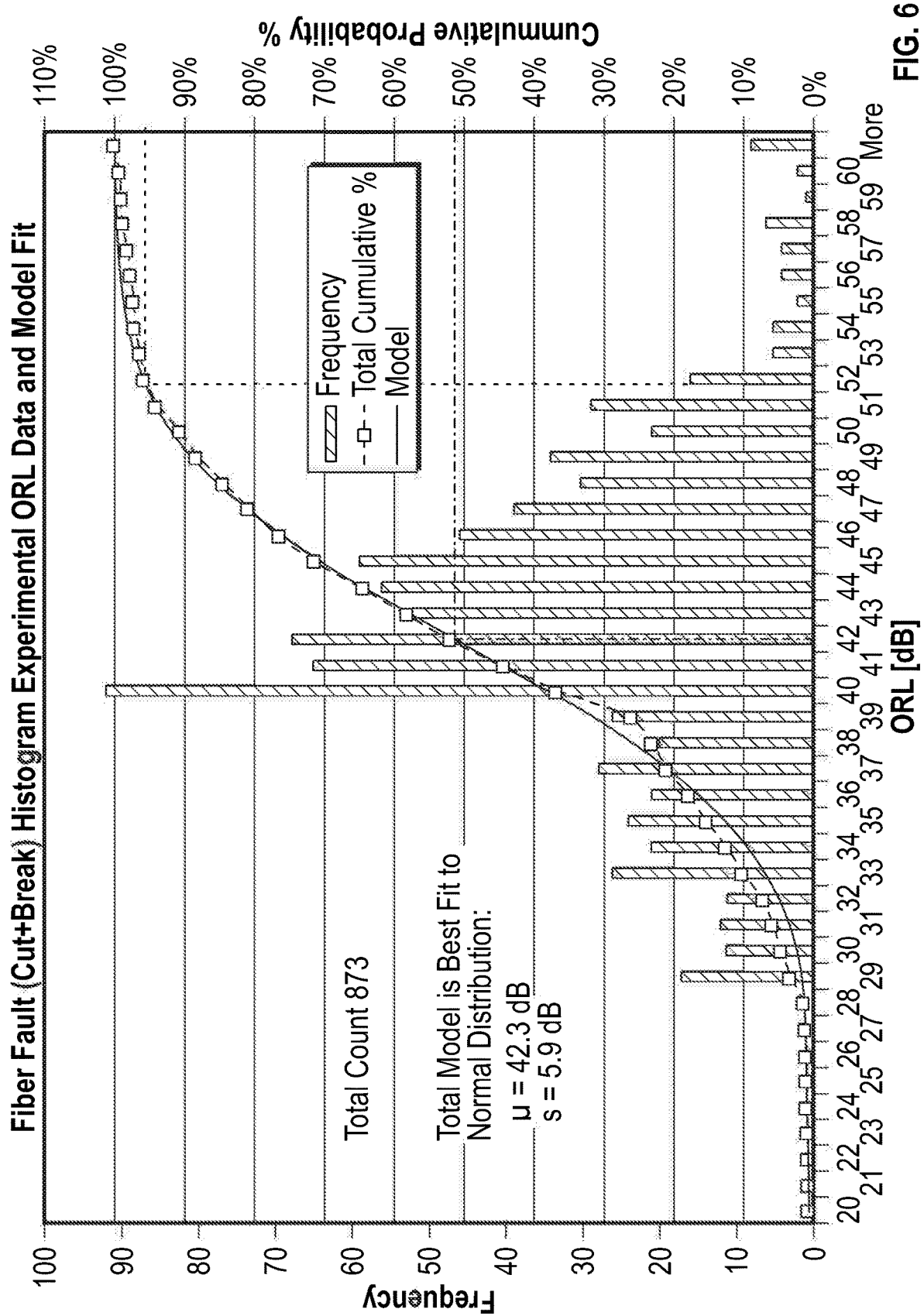
FIG. 6 is a histogram of optical return losses from optical fiber faults.

For example, FIG. 6 shows reflections (ORL—optical return losses) of the first optical signals with wavelengths in channels in the first wavelength band from experimental cuts to optical fibers such as those used in the working path 30 or the protecting path 32. In the example of FIG. 6, the optical transmission system 22 has twenty channels and an aggregated output power of 20 dBm from the headend node 24 into the working path 30 or the protecting path 32, and the upstream input power per channel is approximately −24 dBm per channel. If an exemplary suitable LOS threshold power used to determine when to switch from the working path 30 to the protecting path 32 (i.e., indicative of a failure in the working path 30) is −26 dBm, then the guaranteed ORL would be less than 46 dB.

As can be seen in the experimental results in FIG. 6, greater than sixty percent of cut fibers will have a reflected power higher than the exemplary LOS threshold. The optical switching system 20 prevents these reflected optical signals from being interpreted as an indication of the viability of the working path 30 (which would prevent the necessary switching of data traffic from the failed working path 30 to the protecting path 32).

Returning now to FIGS. 1-5, an example of one embodiment of the optical switching system in use in accordance with the present disclosure will be described. Initially, the one or more upstream optical signal detector 62 monitors optical signals from the tailend node 26 on the working path 30 in the optical transmission system 22. The working path 30 carries bidirectional data traffic between the headend node 24 and the tailend node 26 in the optical transmission system 22 when there is no failure in the working path 30. As long as the upstream optical signal detector 62 detects optical signals from the tailend node 26 that are above a predetermined level of power, the upstream optical signal detector 62 does not transmit the activation signal(s) 66 to the switch 60 or does not electrically switch the data traffic to the protecting path 32.

The headend node 24 transmits data traffic in first optical signals with wavelengths in channels in the first wavelength band and receives data traffic in second optical signals with wavelengths in channels in the second wavelength band on the working path 30. The tailend node 26 transmits data traffic in the second optical signals with wavelengths in channels in the second wavelength band and receives data traffic in the first optical signals with wavelengths in channels in the first wavelength band on the working path 30 and on the protecting path 32.

When there is a failure in the working path 30, such as, for example, a cut, a break, or a disconnect in the optical fiber of the working path 30, the first optical signals with wavelengths in channels in the first band may reflect back into the working path toward the headend node 24 because of the cut portion 56 of the working path 30 and be transmitted back toward the upstream optical signal detector 62.

In one embodiment, the one or more optical coupler 70 (and/or the second optical coupler 71) may drop a portion of the optical signals traveling through the working path 30 through the monitor path 72 and the detector path 74 to the one or more optical filter 64.

The one or more optical filter 64, positioned between the upstream optical signal detector 62 and the tailend node 26, filters the optical signals with wavelengths in channels in the first wavelength band originally transmitted from the headend node 24 that are reflected because of the failure in the working path 30, such that the optical signals with wavelengths in channels in the first band from the headend node 24 reflected because of the break and/or from the cut portion 56 are blocked from reaching the upstream optical signal detector 62. In one embodiment, the one or more optical filter 64 may filter all wavelengths except for those wavelengths in the channels in the second wavelength band, which are transmitted from the tailend node 26 on the working path 30.

The upstream optical signal detector 62 may detect a predetermined level of power of optical signals from the tailend node 26, as filtered by the one or more optical filter 64. The upstream optical signal detector 62 may activate the switch to switch data traffic (or electrically signal a switch of data traffic) from the working path 30 to the protecting path 32, if the upstream optical signal detector 62 detects optical signals from the tailend node 26 that are indicative of a failure in the working path 30. Optical signals from the tailend node 26 may be indicative of a failure in the working path 30 when the optical signals are one or more of (1) below a predetermined level of power and (1) not detected.

In one embodiment, the upstream optical signal detector 62 may send one or more activation signals 66 to the switch 60 to activate the switch 60. The switch 60 may then move the data traffic from the working path 30 to the protecting path 32. In one embodiment, the upstream optical signal detector 62 may electrically switch the data traffic from the working path 30 to the protecting path 32. In one embodiment, the headend node 24 may comprise receiver-transmitter (RxTx) pairs dedicated by optical line. For example, in an embodiment in which the headend node 24 may comprise a first dedicated receiver-transmitter pair for the working path 30 and a second dedicated receiver-transmitter pair for the protecting path 32) (not shown), the data traffic may be electrically switched from the first dedicated receiver-transmitter pair to the second dedicated receiver-transmitter pair if there is a failure in the working path 30.

In accordance with the present disclosure, messages and/or signals transmitted between nodes can be processed by circuitry within the input interface(s), and/or the output interface(s) and/or the control module. Circuitry could be analog and/or digital, components, or one or more suitably programmed microprocessors and associated hardware and software, or hardwired logic.

It should be understood that the headend node 24 and the tailend node 26 can be implemented in a variety of manners including but not limited to those shown and discussed in U.S. Pat. No. 7,343,093, issued Mar. 11, 2008, entitled "Protected Bidirectional WDM Network", the entire contents of which are hereby incorporated herein by reference in its entirety.

Conclusion

Conventionally, optical signals reflected from a cut in a single-fiber bidirectional transmission working path have been interpreted by optical nodes as indicating that the working path was viable, rather than unable to carry data traffic due to the cut, causing the optical transmission system to fail to switch the transmission of data traffic from the working path to the protecting path. In accordance with the present disclosure, optical power reflected in a fiber cut is suppressed by introducing an optical switching system with a filter before the upstream optical detector that suppresses channels except for the channels coming from the tailend node.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Further, while implementations have been described in the context of an optical network, this need not be the case. These implementations may apply to an electronic network using copper cabling, or even a wireless network.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. An optical switching system, comprising:
one or more upstream optical signal detector between a first node and a second node configured to detect upstream optical signals from the second node and to activate the switching of data traffic from a working path, that carries bidirectional data traffic between the first node and the second node in an optical transmission system when there is no failure in the working path, to a protecting path that carries the bidirectional data traffic between the first node and the second node when there is a failure in the working path, when the upstream optical signals from the second node are indicative of a failure in the working path by being one or more of (1) below a predetermined level of power and (2) not detected; wherein the first node is configured to transmit data traffic in first optical signals with wavelengths in channels in a first band and receive the data traffic in second optical signals with wavelengths in channels in a second band, and the second node is designed to transmit the data traffic in the second optical signals with wavelengths in channels in the second band and receive the data traffic in the first optical signals with wavelengths in channels in the first band;
one or more optical filter between the second node and the upstream optical signal detector, the optical filter configured to block signals with wavelengths in channels in the first band that are reflected because of a break in the working path between the optical filter and the second node;
a first coupler that drops a portion of the upstream optical signals;
a second coupler that receives the dropped portion of the upstream optical signals;
a detector path that extends from a first output of the second optical coupler to the optical filter;
a monitor port; and
a monitor path that extends from a second output of the second coupler to the monitor port.

2. The optical switching system of claim 1, wherein the first node further comprises transceiver and a switch positioned between the transceiver and the second node, the switch configured to switch the data traffic from a working path to the protecting path when activated by the upstream optical signal detector.

3. The optical switching system of claim 1, wherein the one or more optical filter is two or more optical filters.

4. The optical switching system of claim 1, wherein the one or more optical filter comprises one or more thin-film filter.

5. The optical switching system of claim 1, wherein the one or more upstream optical signal detector includes two or more upstream optical signal detectors.

6. The optical switching system of claim 1, wherein the first band comprises a first plurality of predetermined bands and the second band comprises a second plurality of predetermined bands.

7. The optical switching system of claim 1, wherein the one or more optical filter includes a first optical filter and includes a second optical filter between the first optical filter and the upstream optical signal detector.

8. The optical switching system of claim 1, wherein one or more upstream optical signal detector and the one or more optical filter are physically located within the first node.

9. The optical switching system of claim 1, wherein the first node is a headend active node and the second node is a tailend passive node.

10. A method, comprising:
monitoring, with one or more upstream optical signal detector positioned between a first node and a second node in an optical transmission system, optical signals from the second node on a working path in the optical transmission system, wherein the working path carries data traffic between the first node and the second node in the optical transmission system when there is no failure in the working path, wherein the first node is configured to transmit the data traffic in first optical signals with wavelengths in channels in a first band and receive the data traffic in second optical signals with wavelengths in channels in a second band, and the second node is designed to transmit the data traffic in the second optical signals with wavelengths in channels in the second band and receive the data traffic in the first optical signals with wavelengths in channels in the first band;
dropping a portion of the upstream optical signals with a first coupler;
receiving the dropped portion of the upstream optical signals with a second coupler;
supplying a first part of the dropped portion of the upstream signal to a detector path that extends from a first output of the second optical coupler to one or more optical filter; and
supplying a second part of the dropped portion of the upstream signal to a monitor path that extends from a second output of the second coupler to a monitor port,
filtering, with saki one or more optical filter positioned between the upstream optical signal detector and the second node, signals with wavelengths in channels in the first band from the first node that are reflected from a break in the working path between the optical filter and the second node such that the optical signals with wavelengths in channels in the first band from the first node reflected from the break are blocked from reaching the upstream optical signal detector; and
detecting, with the upstream optical signal detector, optical signals between the first node and the second node.

11. The method of claim 10, further comprising switching data traffic from the working path to a protecting path if the upstream optical signal detector detects signals from the second node that are indicative of a failure in the working path by being one or more of (1) below a predetermined level of power and (1) not detected.

12. The method of claim 10, wherein the one or more optical filter is two or more optical filters.

13. The method of claim 10, wherein the one or more upstream optical signal detector is two or more PIN photodiode and the one or more optical filter is one or more thin-film filter.

14. The method of claim 10, wherein switching data traffic from the working path to a protecting path comprises switching data traffic from the working path to the protecting path with an optical switch.

15. The method of claim 10, wherein the first band comprises a plurality of first predetermined bands and the second band comprises a plurality of second predetermined bands.

16. The method of claim 10, wherein the one or more optical filter includes a first optical filter and a second optical filter between the first optical filter and the upstream optical signal detector.

17. The method of claim 10, wherein one or more of the upstream optical signal detector and the optical filter are physically located within the first node.

18. A system, comprising:
- a working path in an optical transmission system, wherein the working path carries bidirectional data traffic in the optical transmission system when there is no failure in the working path;
- a protecting path in the optical transmission system, wherein the protecting path carries the data traffic in the optical transmission system when there is a failure in the working path;
- a tailend node in the optical transmission system designed to receive data traffic in first optical signals with wavelengths in channels in a first band and transmit data traffic in second optical signals with wavelengths in channels in a second band; and
- a headend node in the optical transmission system configured to transmit data traffic in the first optical signals with wavelengths in channels in the first band and receive the data traffic in the second optical signals with wavelengths in channels in the second band, the headend node comprising:
  - an upstream optical signal detector positioned between the headend node and the tailend node and configured to detect upstream optical signals from the tailend node and to implement a switch of data traffic from the working path to the protecting path if the upstream optical signals from the tailend node are indicative of a failure in the working path by being one or more of (1) below a predetermined level of power and (1) not detected;
  - one or more optical filter between the upstream optical signal detector and the tailend node, the optical filter blocking signals with wavelengths in channels in the first band from the headend node that are reflected from a break in the working path between the optical filter and the tailend node
  - a first coupler that drops a portion of the upstream optical signals;
  - a second coupler that receives the dropped portion of the upstream optical signals;
  - a detector path that extends from a first output of the second optical coupler to the optical filter;
  - a monitor port; and
  - a monitor path that extends from a second output of the second coupler to the monitor port.

* * * * *